US007016918B2

(12) United States Patent
Andersson et al.

(10) Patent No.: US 7,016,918 B2
(45) Date of Patent: Mar. 21, 2006

(54) OBJECT ORIENTED DATA PROCESSING

(75) Inventors: Johan Andersson, Västerås (SE); Mikael Rudin, Västerås (SE); Thomas Pauly, Västerås (SE)

(73) Assignee: ABB AB, Vasteras (SE)

( * ) Notice: Subject to any disclaimer, the term of this patent is extended or adjusted under 35 U.S.C. 154(b) by 330 days.

(21) Appl. No.: 09/973,069

(22) Filed: Oct. 10, 2001

(65) Prior Publication Data

US 2002/0059282 A1    May 16, 2002

(30) Foreign Application Priority Data

Oct. 12, 2000    (GB)    .................................... 0025050

(51) Int. Cl.
    *G06F 17/30*    (2006.01)
    *G06F 7/00*    (2006.01)
(52) U.S. Cl. ............................. 707/103 R; 707/103 Z; 707/1; 707/2; 707/100
(58) Field of Classification Search .......... 707/103 R, 707/104.1, 1–2, 100, 101, 102, 103 Z; 717/101, 717/104, 116; 703/1, 23
    See application file for complete search history.

(56) References Cited

U.S. PATENT DOCUMENTS

| | | | |
|---|---|---|---|
| 5,280,610 A * | 1/1994 | Travis et al. ............ 707/103 R |
| 5,404,525 A * | 4/1995 | Endicott et al. ............ 717/108 |
| 5,488,723 A | 1/1996 | Baradel et al. |
| 5,664,182 A | 9/1997 | Nierenberg et al. |
| 5,758,351 A * | 5/1998 | Gibson et al. ........... 707/104.1 |
| 5,822,580 A | 10/1998 | Leung |
| 5,872,971 A | 2/1999 | Knapman et al. |
| 5,878,411 A | 3/1999 | Burroughs et al. |
| 5,905,987 A * | 5/1999 | Shutt et al. ............. 707/103 R |
| 5,918,052 A | 6/1999 | Kruskal et al. |
| 6,169,993 B1 * | 1/2001 | Shutt et al. ............. 707/103 R |
| 6,314,434 B1 * | 11/2001 | Shigemi et al. ............. 707/203 |

FOREIGN PATENT DOCUMENTS

| | | |
|---|---|---|
| EP | 0 629 946 A2 | 6/1994 |
| EP | 0 664 510 A2 | 7/1995 |
| EP | 0 841 612 A2 | 11/1997 |

OTHER PUBLICATIONS

Systems and Computers in Japan, 1996, vol. 27, ppgs 23-32; T. Ishimaru & S. Uemura; "An Oject-Oriented Data Model for Multiple Representation of Object Semantics".
Data & Knowledge Engineering, 1995, vol. 17, No. 2, pp. 127-158; F.S. Mhlanga et al; "A new approach to modelingpersonal office documents".
Artificial Intelligence in Engineering, 1992, vol. 7, No. 1, pp. 47-61; A. Demaid & J. Zucker; "Prototype-oriented representation of engineering desing knowledge".
Gamma et al., "Design Patterns" 1995, pp. 87-116.

* cited by examiner

Primary Examiner—Greta Robinson
Assistant Examiner—Kuen S. Lu
(74) Attorney, Agent, or Firm—Dykema Gossett PLLC (57) ABSTRACT

A method and arrangements in a computerized system for control operations is disclosed. The computerized is adapted for processing data associated with real world entities based on objects representing the real world entities. In the method at least one formal instance is created, the at least one formal instance containing information regarding instantiation of at least one object. At least one formal instance is associated with one or more formal instances or groups of formal instances based on information of the type of said at least one object or the at least one formal instance.

8 Claims, 4 Drawing Sheets

OBJECT ORIENTED DATA PROCESSING

FIELD OF THE INVENTION

The present invention relates to processing of data, and in particular to object oriented data processing for a control system.

BACKGROUND OF THE INVENTION

In contemporary computer based systems for controlling e.g. manufacturing and process industries, such as chemical plants, oil refineries, pulp and paper mills, steel mills, automated factories and so on, or other control systems, such as traffic management systems or intelligent building control system, there has typically existed a large range of different applications of different origin that have had to be integrated into a single control system. Further, a control system typically includes several computers connected through a data communication network, where said applications are distributed in different configurations for different installations. The communication network may be a closed local network (e.g. a local area network LAN), a closed global network (e.g. an intranet network) or an open global network (e.g. the Internet).

Traditional methods for this integration have entailed substantially lengthy development times resulting, for example, in significant changes in requirements before such control programs have been completed and made ready for use. A second problem with traditional development methods is that it has been difficult and lengthy to update such control programs to include new requirements, such as the integration of additional and new applications. Writing and modifying control system programs to combine newer applications with older, existing applications, which older applications are sometimes called legacy applications, has also been difficult, time consuming and expensive. Sometimes the update has required a replacement of the entire existing application with a newer one.

The adoption of object-oriented programming languages and methods has led to somewhat shorter development times, and made it somewhat easier to incorporate or integrate new applications. An aim of the object oriented techniques is to break the task down to smaller autonomous entities that are enabled to work together to provide the needed functionality. These individual entities are called objects. During the development of the set of control instructions (i.e. the control software) the designer determines what objects are needed and the interrelations of each chosen object with other objects. Examples of object oriented technology, without limiting to these, include technologies such as C++ or Java.

The object oriented technologies typically require instantiation of the objects to obtain instances of the objects for use by the computer in the data processing operations. The instantiation has conventionally referred to the use of object classes which include the function of an object. The instances created by the instantiation form individual entities that can be made unique by addition of different properties thereto. An adaptation of an object is made by changing these properties.

An object may have different aspects, each aspect defining more precisely the nature and/or function of the object. That is, an object may associate with one or more different aspects that represent facets of a real world entity that the object represents. An aspect may provide a piece of the functionality of the object. An aspect may be either exclusive or shared by several objects. An object may inherit an aspect from another object.

Objects may be divided between 'object type' objects and instances. The objects belonging to instances may inherit aspects from object types and other objects. The aspects of object type objects may be shared by several instances.

The term 'object type' refers to a functionality that may be used at the instantiation stage of objects to reassemble those instances that are needed to model a real world entity or object in a computerised system. An object may be a composite object or a simple object. The term 'composite object' refers to an object that represents several objects i.e. a collection of objects. A composite object type in turn can be defined as an object type that at an instantiation stage results in the instantiation of several objects that may be of several types. A reference is made herein to FIG. 2 that illustrates the difference between the composite object type (person type A) and a simple object type (Heart type A).

IEC standard DIS ISO/IEC 1346-1 1995 "Structuring principles and reference designations", contains a reference designation system for the unambiguous identification of parts of any system in the general technical context such as in a manufacturing company, plant or operating company or other organisation. Within this description the terms object, aspect and reference designations in particular are used to refer such parts of any system in the general technical context in accordance with the definitions in the DIS standard ISO/IEC 1346-1. In addition, certain additional types of objects and aspects will be additionally defined in the course of this description.

U.S. Pat. No. 5,787,425 describes a concept of client/server relationships between objects in an object-oriented computer program. The objects may communicate with each other, for example in order for a first object to access data held by a second object. When the first object needs access to some data controlled by the second object, the first object is considered to be a client of the second object, which in turn is considered to be a server. To access the data controlled by the server object, the second object in this example, one of the operations of the first object, the client object, will call or invoke one of the operations of the server object. The operation of the server object thus invoked is then executed to access and/or manipulate the data on behalf of the client object.

However, the conventional system design requires that an object in a computerized system has prior information about an application in order for the object to, for example, access a method implemented by the application. The identities of the objects need to be known by those applications which want to access the other applications. However, this may not always be an optimal way to design all system including computers and/or the creation of instances of objects may require substantial amount of time. The inventors have found that there is a need for a new way to design and instantiate systems to integrate applications, such that different applications can be both fully independent, based on different technologies, and without knowledge of the specifics of each other, and at the same time able to co-operate with each other to perform the collective functionality of the computerized system.

SUMMARY OF THE INVENTION

Embodiments of the present invention aim to address one or several of the above shortcomings of the prior art.

According to one aspect of the present invention, there is provided a method in a computerised system adapted for processing data associated with real world entities based on objects representing the real world entities. The method comprises: creating at least one formal instance, the at least one formal instance containing information regarding instantiation of at least one object; and associating the at least one formal instance with one or more formal instances or groups of formal instances based on information of the type of said at least one object or the at least one formal instance.

The method may comprise a further step of instantiation of the at least one object based on the information contained in the at least one formal instance and on information regarding at least one group with which the said at least one instance associates. The step of instantiation may comprise creation of at least one real instance to be used by the computer system in said processing of data.

A plurality of groups of formal instances may be created, the different groups of formal instances representing different types of objects. The groups may be based on features of the real world entities represented by the objects. The different groups of formal instances may be arranged in structures based on the type of the objects the individual groups associate with. The structures may be used to describe the relations between different groups of formal instances.

A formal instance may be associated with a plurality of different groups of formal instances based on the type of the object the formal instance associates with.

At least one of the objects and/or at least one of the formal instances may associate with at least one aspect. The content of a set of aspects may be changed. At least one of the aspects may be inherited. A formal instance may contain a description how to make changes to aspects of those objects that are to be instantiated.

A formal instance may represent a group of formal instances. Alternatively, selected formal instances or all formal instances of a group of formal instances may represent said group of formal instances.

Instantiation of an object type may result in instantiation of at least two objects associated with said object type. The objects to be instantiated may be instantiated based on formal instances that belong to different groups of formal instances. Instantiation of a composite object type may result in instantiation of a group of objects.

The computerised systems may be arranged to locate an object type indicative of an object to be instantiated, to locate a formal instance in a first structure group describing the instantiation of the object, to create real instances out of all formal instances in said first structure group and other structure groups that are associated with said first structure group. The computerised system may be adapted to control operation of a real world entity based on at least one object representing the entity and instantiated based on information contained in a formal instance.

According to an aspect of the present invention there is provided a computer program comprising program code means for performing any of steps of claim 1 or any claim dependent thereto when run on a computer. The program code means may be stored in a computer readable medium. The computer program may be used for controlling operation of real world entities.

According to another aspect of the present invention there is provided a method of controlling real world entities by means of a computerised control system based on objects representing the real world entities. The method comprises: creating a formal instance, the formal instance containing information regarding instantiation of at least one object; placing the formal instance in one or more groups of formal instances, the selected group or groups being indicative of the type of said at least one object; initiating instantiation of an object that is required by the control operations, the object being associated with the created formal instance, wherein the step of initiation comprises obtaining information from the formal instance; and instantiating the object based on said information and also information regarding the group or groups the formal instance is placed in.

According to another aspect of the present invention there is provided a method for instantiation of an object that represents a real world entity, the method comprising: generating a formal instance describing the instantiation of the object; placing the formal instance into one or more groups of formal instances based on the type of the object; and instantiating the object based on information in the formal instance and also on information of the type of the object.

According to another aspect of the present invention there is provided a data processing system comprising a data processor and storage means for storing data. At least a part of said data is stored as objects that can be instantiated for use by the data processor. The arrangement is such that at least a part of the objects are instantiated based on information contained in associated formal instances and information regarding the type of the object to be instantiated. The data processing system may be arranged to control operation of real world entities that are represented by objects to the system.

According to another aspect of the present invention there is provided a data entity for object oriented data processing that is based on use of a plurality of objects. The data entity contains information regarding instantiation of one or more objects and is included in at least one group of data entities, each group of data entities being indicative of different characteristic features of the objects.

The embodiments of the invention may lead to substantial savings in time when creating instances of objects. The embodiments may provide an efficient replication of objects for instantiation, and therefore an instance may be used for representing several real world entities. The embodiments may create efficiently consistent extensions of objects with low system requirements.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

The following will describe with reference to the drawings clarifying examples of how the various objects and/or instances may be organised into groups based on relations between various aspects of a real world entity. More particularly, the following will discuss a possibility for instantiation of objects based on use of specific data entities referred to as formal instances in accordance with the principles of the present invention.

The formal instances are data entities that are created to describe the way that how objects should be instantiated to obtain real instances of the objects. In other words, a formal instance can be described as a data entity that contains information regarding how one or more objects or "real" instances shall be instantiated. A formal instance does not directly represent any of the real world objects. Instead, a formal instance can be used as a tool that enables instantiation of one or more objects that will then represent a real world object. One or more groups of objects with predefined members may be instantiated when an instantiation of an object type is made. An instantiation of an object type may lead to instantiation of several groups of objects of several types.

A formal instance can also be used as a base for instantiation of a composite object type. That is, a formal instance may be used in the definition of composite object types to define which objects of which object types should be instantiated as part of a composite object type.

The instantiation of a composite object type may lead to instantiation of a collection or group of objects. These objects may be organised into one group of objects or into a plurality of groups of objects. These object groups may reflect different kinds of relations between the group object and the participants of the group (i.e. the objects in the group). In this context the term 'group object' is intended to mean an object that represents the object group. That is, the group object can be seen as an object representing a number or a collection of objects.

Specially designed grouping, herein called structures may be used to define different instance or object groups. The groups may be placed in different structures so that the relative locations of the groups indicate different kinds of relations between the groups and the objects or instances in the groups. For example, when a composite object type is instantiated a real instance is created for each formal instance that is defined to be a part of a particular object type group. In the following embodiments of the instances of the objects i.e. "real" instances are placed in such structures and organised in groups based on organisation of the formal instances in the composite object type.

A formal instance may also contain adaptations of the basic object type. That is, in addition to describing how to use an object type for the instantiation, a formal instance may also be used to describe how to make changes and/or what changes are to be made in the objects to be instantiated. The changes may be made in the aspects of the formal instance.

Figure 2:
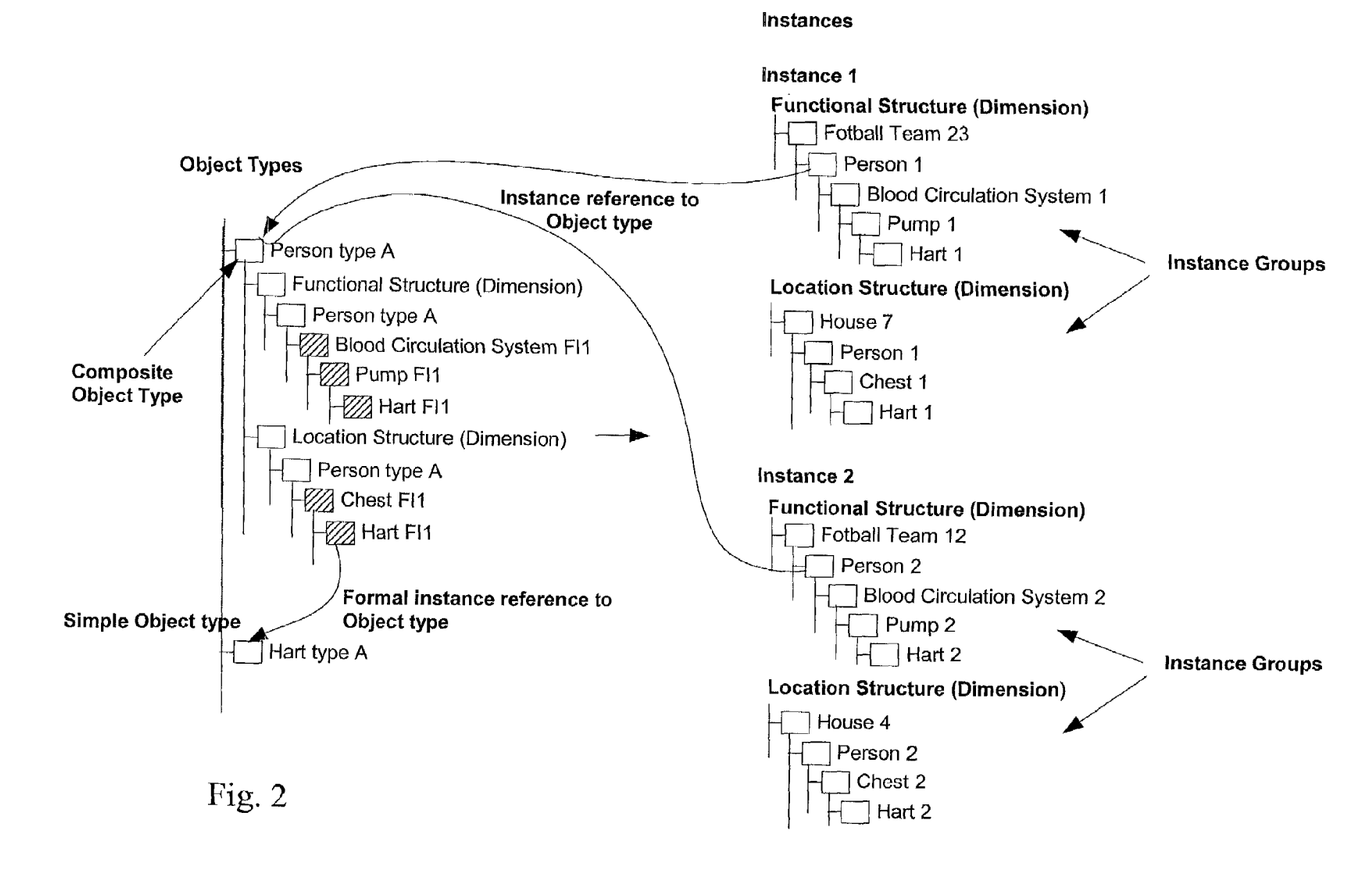
FIG. 2 is a schematic example of formal instances that may be assigned for the instances of FIG. 1 in accordance with the present invention.

The formal instances can be grouped to different categories i.e. dimensions (see the left hand side of FIG. 2). Each dimension corresponds to a structure into which a certain group of formal instances should be placed. The organisation of the different groups of formal instances into different structure groups defines the structure in which the final i.e. "real" instances are going to be placed. Each structure group may consist of one or more groups of formal instances.

The grouping of the formal instances may be accomplished by defining a formal instance that represents a group in which the other formal instances associated with said group formal instance are placed. All formal instances of the group may represent the group. It is also possible that only selected ones or even none of the formal instances of a group may represent the group. According to one possibility the capability of representing the group depends on whether the formal instance is associated with children or not, wherein the "childless" formal instances are not representing the group. In case all formal instances are enabled to represent the group, the grouping is recursive. A formal instance can also be a part of several groups.

In the herein described embodiments instantiation of an object type will result in the instantiation of one or several objects that may have been organised in several groups. The groups may be, in turn, organised in several dimensions i.e. placed in several structures. When modelling real world entities in computerised systems an entity is allowed to belong to several composite objects and at the same time contain any number of composite entities or not a single composite entity. The following will describe in more detail a possible way of creation of groups of formal instances based on the object type definition such that the formal instances may be grouped in several dimensions. This approach enables unfolding of the features of a real world entity to several structures. The unfolding results in a generation on demand a plurality of software objects with interrelationships and function as predefined by, to a large extent, the formal instances.

Figure 1:
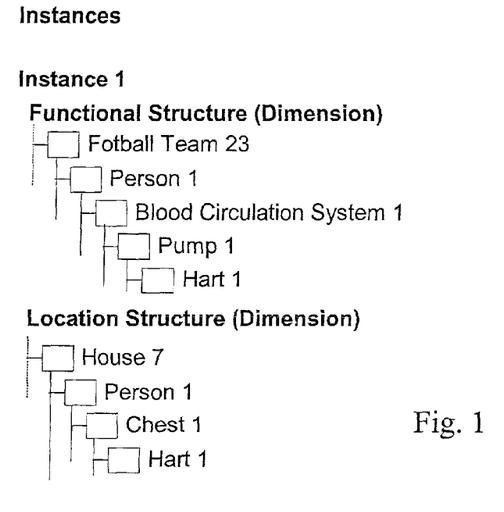
FIG. 1 is an example of organising instances into structures.

Rather than being an example of an actual implementation of a computerised control system, the example shown in FIGS. 1 and 2 is presented to illustrate the above described principles of the present invention. The example relates to a person who is a member of a football team and lives in a house. The person has a blood circulation system and a pump function for circulating the blood. The pump function comprises a heart. The heart is located in the chest of the person. As can be seen from FIG. 1, the objects 'person 1' and 'heart 1' can be placed in two different dimensions i.e. structures based on functional features and location of the object, respectively.

When an object type is instantiated an instance of the object (object instance) is created for each formal instance defined in the object type. The object instances are shown on right hand side of FIG. 2. The object instances are organised into groups according to the definition in the object type. The formed object instance groups are then placed in the structures also based on the definitions contained in the object type.

The object instances are divided further into two instance groups, that is into functional and location structures. The exemplifying object instances instance 1 and instance 2 have different roots or nodes (two football teams 23 and 12 and two houses 7 and 4). As can be seen, instance 1 defines those objects that associate with person 1 while instance 2 defines those objects that associate with person 2. However, both instances refer to the object type 'person type A', i.e. are defined as type A persons for the system.

It should be appreciated that although FIG. 2 shows for clarity reasons two object instances (instances 1 and 2) and four instance groups only, the number of object instances and groups is not limited to this.

A detailed description of an object type in a structure can be made based on an object type object, one or more structure objects and formal instances of other object types. In FIG. 2 'person type A' forms the object type object. The description of A type person can be made more detailed by the 'functional structure' and 'location structure' which form a structure object each. The structure objects contain formal instances 'blood circulation system FI1', 'pump FI1', 'heart FI1' and 'chest FI1'.

As shown by FIG. 2, the object type objects 'person type A' and 'Heart type A' are placed at the root of an object type. The structure objects are then placed below the object type object in the structure. More particularly, the structure objects ("dimensions") define the structures into which the formal instances of the objects should be placed in the given object type.

The formal instances are preferably placed in the hierarchy below the structure objects. The formal instances can be used to define the structures of the model in which the real instances should be created. A formal instance can be placed below one or more structure objects (see e.g. Heart FI1). It is also possible to place a formal instance several times below a structure object. That is, it is possible to place a formal instance below as many structure objects and as many times as is considered as necessary. Since the formal instances are used for the purposes of instantiation of the objects, there is, at least in principle, no restrictions in the number of formal instances that may be placed in a structure object. The same formal instance can also be used several times in a structure. The formal instances can be organised in one or more groups that are placed below the structure objects.

In a preferred embodiment of the present invention the above described organisation is applied to computer aided control of real world entities. For example, the formal instances and the organisation thereof may be applied to computerised control of various apparatus in a factory or power plant or process industry and so on.

Figure 3:
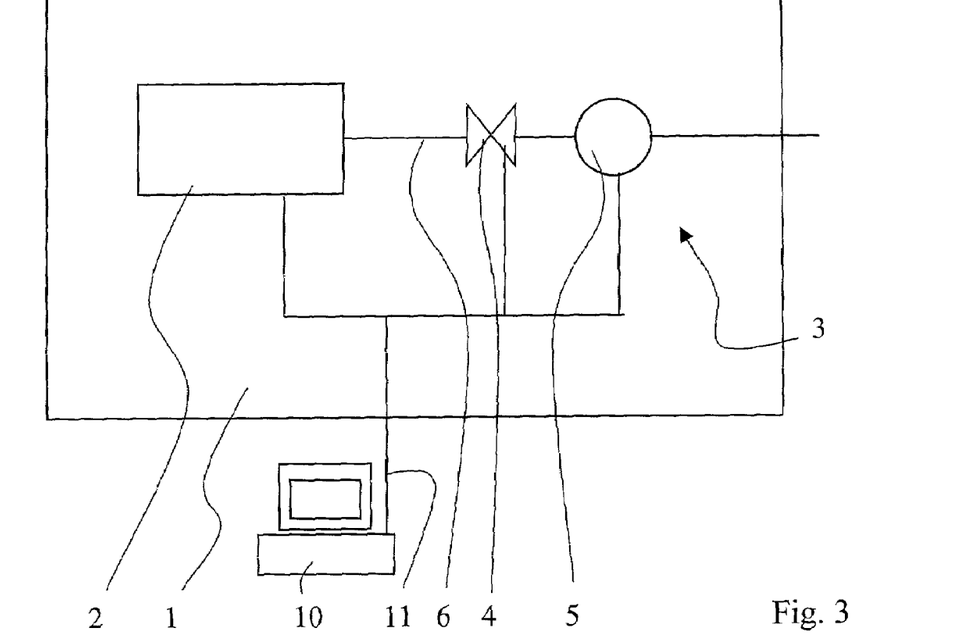
FIG. 3 shows real world entities that may be controlled based on the use of formal instances.

FIG. 3 is a schematic presentation of a process employing various elements which may be controlled by means of a computerised control arrangement that is based on use of formal instances and organisation thereof into groups as described above. The element of the process are located in a plant 1. A tank 2 is shown to be connected to an inlet system 3. The inlet system 3 comprises a pipe 6, a valve 4 and a pump 5.

The elements of the FIG. 3 system may be divided, for example, into two different object types, that is between objects that associate with the tank 2 and objects that associate with the inlet system 3. The objects can also be grouped based on location (e.g. objects in the plant 1 and objects close to the tank) and function (e.g. objects associated with storage and transportation of fluid).

FIG. 3 shows also a data processing unit 10 adapted to control the operation of the process. The data processing unit 10 may be implemented in the form of a computer adapted to accomplish the control functionality. The data processing unit typically comprises required input and output means, processors, such as a central processing unit (CPU) and memory means, such as ROM and RAM. All these features are known by the skilled person, and will thus not be explained in more detail. A data connection 11, such as a bus, is also shown to be provided between the data processing unit 10 and the real world entities 2, 3 and 5.

Figure 4:
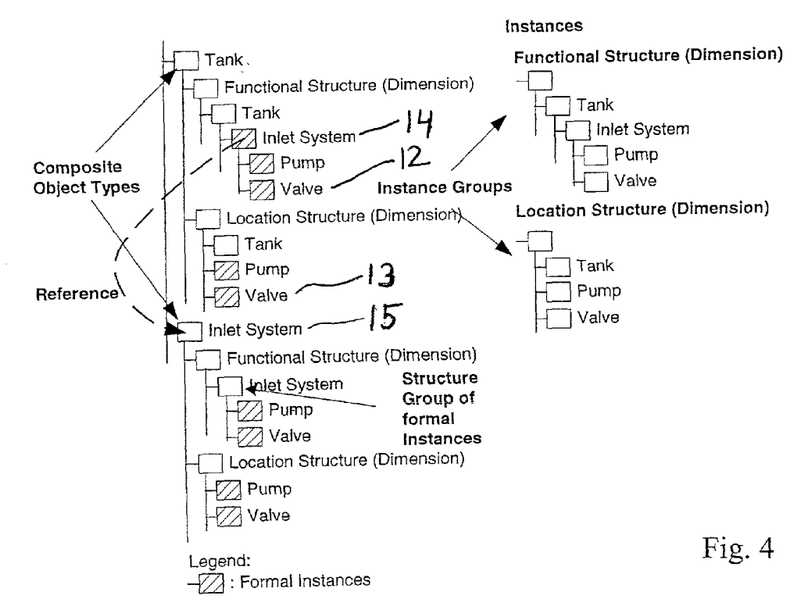
FIG. 4 shows a possibility to organise structures to control the FIG. 3 system.

A possible organisation of the objects and formal instances that are used for the control of the FIG. 3 system is shown in FIG. 4. In FIG. 4 the composite object types comprise root definitions 'Tank' and 'Inlet System'. Both of these roots are illustrated to have dimensions 'functional structure' and 'location structure'. The object types i.e. the roots are shown to comprise composite object types 'Tank' and 'Inlet System'.

The functional structure of the object type 'Tank' includes structure object 'Tank', a formal instance 'Inlet System' and a structure group formed by formal instances 'Pump' and 'Valve', said group being dependent from the 'Inlet System' formal instance. The location structure of the object type 'Tank' contains structure object 'Tank' and formal instances 'Pump' and 'Valve'.

The functional structure of the object type 'Inlet system' includes structure object 'Inlet system' and a structure group formed by formal instances 'Pump' and 'Valve', said group being dependent from the formal instance 'Inlet system'. The location structure of the object type 'Inlet system' includes formal instances 'Pump' and 'Valve'.

A formal instance can also be placed in more than one structure. That is, a formal instance in one group of a structure may be the same instance that has been placed in another structure. An example of this in FIG. 4 is a formal instance 'valve' that is shown to be placed in locations 12 and 13.

A formal instance may refer to one or more object types. In FIG. 4 a dashed line illustrates a reference from the formal instance 'Inlet system' 14 to a composite object type 'Inlet system' 15.

In an embodiment of the present invention each of the real world entities, such as the pump 5 or valve 4, is represented within a computer program run by the computer 10 as an object. The computer program contains program code means to instruct the computer 10 to carry out functions it is intended to implement. During the instantiation phase of the computer program the code means direct the computer to fetch those formal instances that associate with the objects required for the operation, such as the valve or the pump. The instantiation may be based on information contained in the formal instances associating with these objects and also on information regarding the location of the formal instances in the structures. During instantiation one or more instances of an object representing a real world entity is created to be used by the application, such as a control software. The properties of the object instance may also be adapted to fit special requirements or the application and/or changes in the object. The instantiation may occur based on information of the object type, especially the organisation of the formal instances in the object type, and the information contained in a particular formal instance.

To accomplish the above, the data processing entity such as the computer 10 may start looking for an object type that is indicative of the object it needs for performing the required data processing. After having found the desired object type, the computer goes through all formal instances in the structure group below the object type. The computer also checks any structural relationships the formal instances may have. Based on the information received from the analysis of the formal instances the computer then creates required real instances for use in the data processing to complete a given task.

In the FIG. 4 example this would mean that in order to create a real instance 'Inlet system 1' the computer looks first for object type 'Inlet system' in the structures. After having located the 'Inlet system', the computer may look for all formal instances that are below the object type 'Inlet system'. In the example these formal instances are 'Pump' and 'Valve'. After this real instances 'Tank 1', 'Inlet system 1', 'Pump 1' and 'Valve 1' are generated out of all formal instances found in this structure group of formal instances.

The 'Inlet system' is located only in the functional structure and not in the location structure. However, the computer checks also the location structure of the same composite object type to check if the same formal instances 'Valve' and 'Pump' can be found there. If a formal instance found in one group of the structure is found in another group of the structure, all formal instances of that group will also result in instantiation of real instances these formal instances refer to. However, a formal instance that is found in more than one structure group will result in generation of one real instance only.

Figure 5:
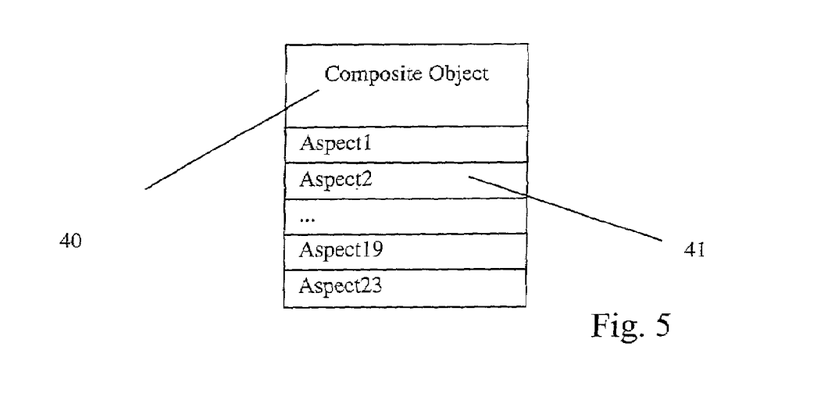
FIG. 5 is a schematic presentation of aspects.
Figure 6:
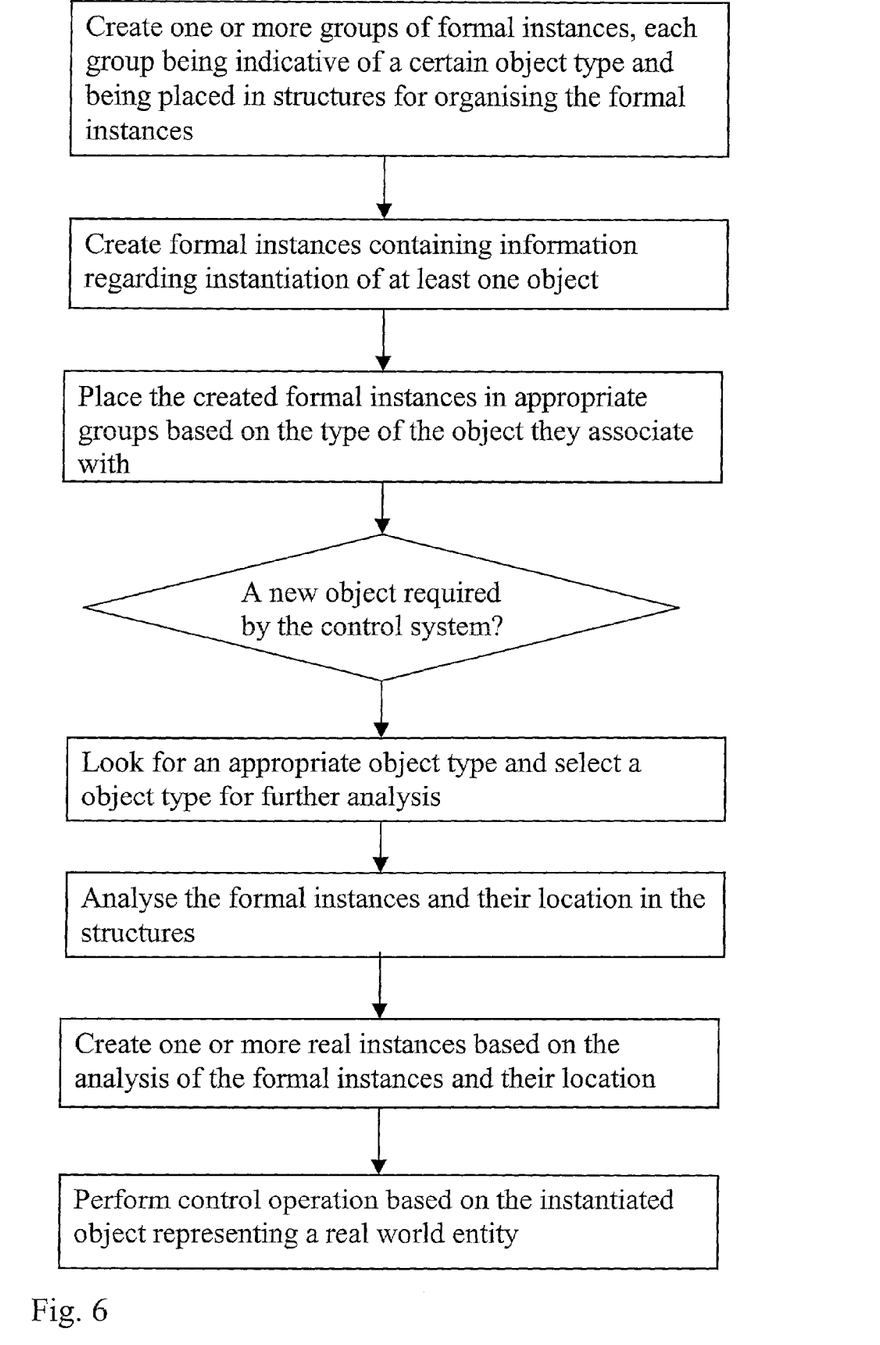
FIG. 6 is a flowchart illustrating the operation of an embodiment of the present invention.

As was briefly mentioned above, each object and/or formal instance may have one or more associated aspect. FIG. 5 discloses an object 40 with twenty-three aspects 41. The aspects of an object typically relate to the real world entity represented by the object. More particularly, an aspect may represent one facet of the real world entity, said aspect being typically responsible for all operations on that facet of the object and its data. Thus for a pump, for example, one aspect could represent a physical location of the pump, another aspect could represent a blue print diagram of the pump, another aspect could represent a security descriptor of the pump, another aspect could represent a control for an operation of the pump, another aspect could represent documentation of the pump, another the number of inlets/outlets and so on.

A formal instance may inherit one or more of its aspects from one or more object type objects.

Different applications may be used to implement different aspects or groups of aspects of an object and/or a formal instance. For example, a word processing program may be used by one aspect to display a functional specification, and by another aspect to edit operator notes. Similarly a CAD program may be used by an aspect to display a drawing, and used by another aspect to display an electrical diagram or by a third aspect to display a piping and instrumentation diagram. Application programs are not limited in any way to those programs used in traditional progress control methods. For example a production management application may be used by one aspect to display a job order, by another aspect to run an equipment schedule or by a third aspect to show material in stock and so on.

The embodiments that are based on use of formal instances enable integration of a large range of applications into a computerised system in a modular and independent fashion. Each application is, by means of the objects and aspects contained by the objects, responsible for its own data and operations. This means that applications that are internally based on different object or non-object oriented implementation technologies can be integrated in such a way that no difference is apparent between the methods for supplying services provided by the different applications. This also means that modifying an application or adding an application requires no change to other applications in the system. This is a particularly useful feature because it facilitates the addition of new object types which may require addition of new aspects, including new applications to manage these new aspects.

Aspects may also provide a way to indicate inheritance which enables objects or instances to inherit certain aspects automatically without necessarily defining inheritance relationships between specific objects and/or instances.

The embodiments may thus provide benefits in several respects including: i) for the developer of a system, who can integrate existing, new, and future possibly not yet anticipated applications, without having to significantly re-write every application to fit with any particular data model or implementation technology, ii) for the user of the system, who will perceive a seamless integration of vastly different applications that co-operate to provide the full functionality that is associated with the real-world entities that he or she is dealing with and iii) for the owner of the system whose investment is protected because the system may be developed with, or extended by, applications not previously anticipated.

It should be appreciated that any real world entity or object may be presented as an object in a process. The real world entity may be an actual object such as a pump, a motor, a valve, a sensor, a conveyor, a milling machine, a lathe or any other device that may be controlled by means of a computerised control system. A controller may also control one or several sub-controllers. The real world entity may also be a more abstract object such as a purchase order, production batch, an invoice, a production plan and so on. It should be appreciated that the embodiments are not limited to traditional control or process control areas. The object may present, for example, a device or process in a home or a person carrying a stage or role in a process, or intangible objects such as messages, status of information and so on.

It should also be appreciated that the applicability of the present invention is not limited to traditional process control functions and use, but extends as well to many other areas. This includes business and commercial activities such as production management, design and maintenance systems, and business and financial systems. It also includes control of equipment in other locations including equipment or processes in a residence or a home. Therefore it should be appreciated that whilst exemplifying embodiments of the present invention have been described in relation to systems including pumps and fluid conduits and/or control thereof, embodiments of the present invention are applicable to any other type of equipment and operation. Furthermore, while the above examples discuss arrangement of the instances and formal instances in groups based on functional features and location of the object, the organisation to groups can be based on any features, such as features associated with control of objects and real world entities or any characteristic thereof.

It is also noted herein that while the above describes exemplifying embodiments of the invention, there are several variations and modifications which may be made to the disclosed solution without departing from the scope of the present invention as defined in the appended claims.

The invention claimed is:

1. A method for automatic control of real world entities by a computerized control system, wherein the entities are represented as instances of objects, and wherein the control of an individual entity depends on the relationship of the entity to other entities, the method comprising the steps of:
   creating at least two structures, wherein each structure is based on a certain type of relationship between object instances;
   creating at least one composite object type comprising at least two formal instances, wherein each formal instance contains information about instantiation of a certain object type and the at least one composite object describes by means of formal instances how to arrange object instances in data structures that are not in the same class hierarchy, and wherein at least one such object type defines a function for control of an entity;
   locating each formal instance in at least one of two groups of formal instances, wherein each group is associated with a structure, and at least two groups are associated with different structures;
   instantiation of the composite object type, wherein for each group of formal instances corresponding real world object instances are created and located in the structure with which the group is associated; and
   automatically changing at least one object instance thus created, said object instance defining a function for control of a entity, such that said function for control is adapted to the relationship of the object instance to other object instances in at least one of the resultant structures such that the control of the corresponding entity is adapted to the relationship of said entity to other entities.

2. A method according to claim 1, wherein at least one formal instance is of a composite object type.

3. A method according to claim 1, wherein one structure is based on functional properties of the entities and another structure is based on the physical location of the entities.

4. A method according to claim 1, wherein a formal instance comprises a description of how the properties of the corresponding object type are to be changed when an actual instance is created.

5. A method according to claim 1, wherein at least one formal instance represents a group of formal instances.

6. A system for automatic control of real world entities by a computerized control system, wherein the entities are represented as instances of objects, and wherein the control of an individual entity depends on the relationship of the entity to other entities, the system comprising:
    at least two structures, wherein each structure is based on a certain type of relationship between object instances;
    composite object types comprising at least two groups of formal instances, wherein each group is associated with a structure, and wherein each formal instance contains information about instantiation of a certain object type and the at least one object type describes by means of formal instances how to arrange object instances in data structures that are not in the same class hierarchy, and wherein at least one such object type defines a function for control of an entity;
    automatic functions which, when the composite object type is instantiated, for each group of formal instances create corresponding real world instances and locate these in the structure with which the group is associated, and change at least one object instance, thus created, which defines a function for control of an entity, such that said function for control is adapted-to the relationship of the object instance to other object instances in at least one of the structures in which the object instance is located, the control of the corresponding entity thus being adapted to the relationship of said entity to other entities.

7. A computer program comprising program code means for performing any of the steps of a method of automatically controlling entity in computerised control applications wherein the entities are represented as instances of objects, and wherein the control of an individual entity depends on the relationship of the entity to other entity, the automatic control method comprising the steps of:
    creating at least two structures, wherein each structure is based on a certain type of relationship between object instances,
    creating at least one composite object type comprising at least two formal instances, wherein each formal instance contains information about instantiation of a certain object type and at least one object type describes by means of formal instances how to arrange object instances in data structures that are not in the same class hierarchy, and wherein at least one such object type defines a function for control of a entity,
    locating each formal instance in at least one of two groups of formal instances, wherein each group is associated with a structure, and at least two groups are associated with different structures,
    instantiation of the composite object type, wherein for each group of formal instances corresponding real world object instances are created and located in the structure with which the group is associated,
    automatically changing at least one object instance thus created, said object instance defining a function for control of a entity, such that said function for control is adapted to the relationship of the object instance to other object instances in at least one of the resultant structures such that the control of the corresponding entity is adapted to the relationship of said entity to other-entities.

8. A computer program as claimed in claim 6, wherein the program code means are stored in a computer readable medium.

* * * * *